Sept. 15, 1931.    J. H. DALEN    1,823,031
CUTTING BLADE
Filed Jan. 7, 1929
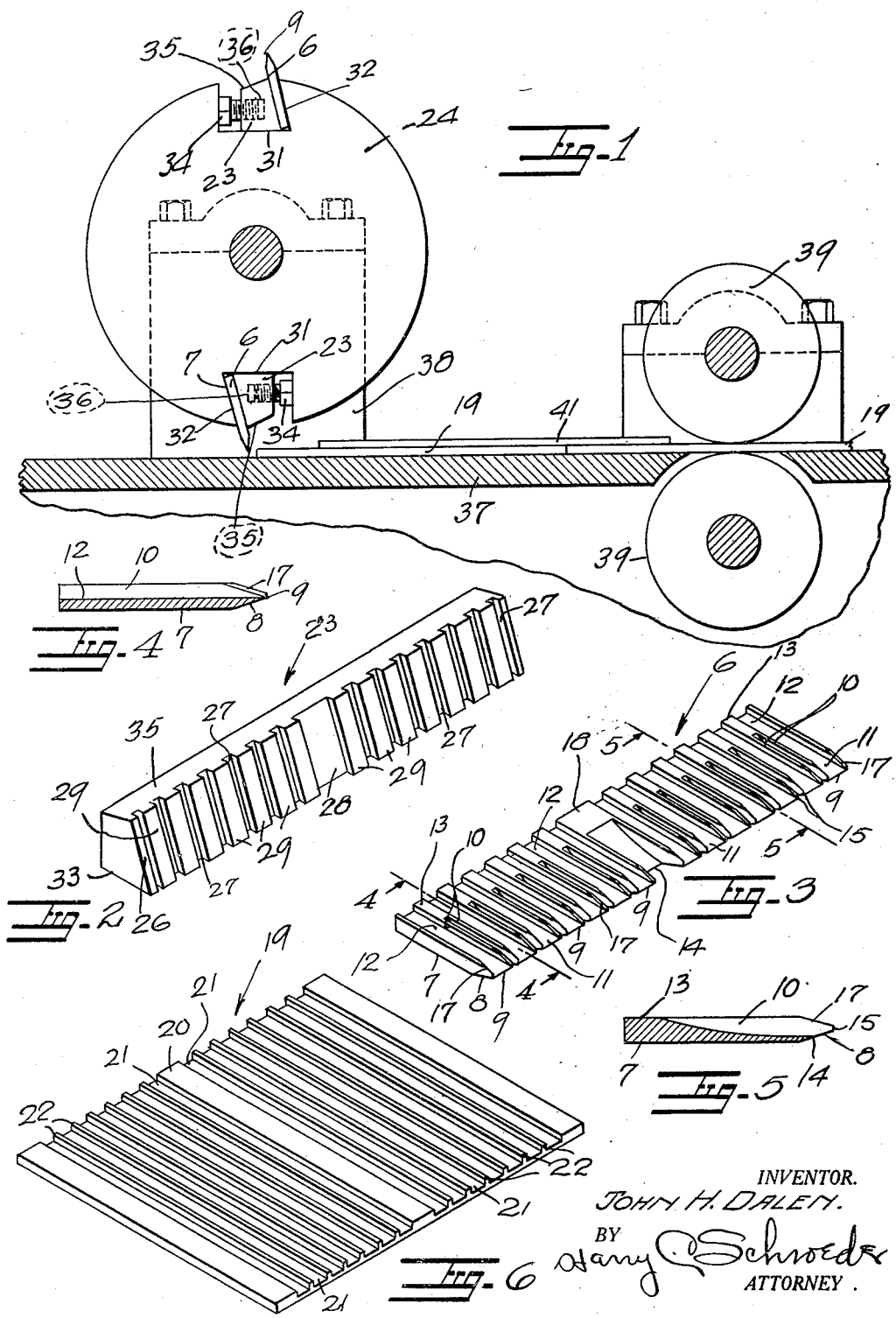
INVENTOR.
JOHN H. DALEN.
BY Harry C. Schroeder
ATTORNEY.

Patented Sept. 15, 1931

1,823,031

UNITED STATES PATENT OFFICE

JOHN H. DALEN, OF BERKELEY, CALIFORNIA

CUTTING BLADE

Application filed January 7, 1929. Serial No. 330,807.

The invention forming the subject matter of this application relates to cutting blades for use in connection with the cutting of grooves on the face of a battery separator.

There are cutters and blades employed at the present time for producing a certain contour for a separator. In the case of battery separators, one face of the battery separator is plain or smooth, while there are grooves cut in the other face of the separator. Heretofore, the finishing of battery separators involved the following steps: First, a block of wood, from which the battery separators are sliced, was steamed or otherwise prepared for the slicing; then, the extremely thin battery separators were sliced off the block by a suitable machine. Then, the battery separators were dried, and the dry separators were introduced in a machine in which blades were provided on a rotary cutter which cut grooves on one face of each battery separator. The cutters used for this purpose were the usual blades having serrated edges or cutting teeth thereon, which teeth are efficiently employed in connection with the dried battery separators.

The primary object of the invention is the provision of cutter blades for use in connection with the cutting of grooves on a face of a wet or green battery separator, which blades are adapted to efficiently cut the grooves from a damp or wet battery separator, thereby eliminating the step of drying the battery separators before the same can be entered into the grooving or cutting machine.

Another object of the invention is the provision of a cutter blade to be used on rotating cutters for cutting grooves on a face of a damp or wet battery separator, the cutter blade being formed from a single piece of metal so as to provide cutting teeth, spaced from each other, the teeth having ribs extending from the opposite sides thereof, the ends of which are sharpened in such a manner that the sharp sided edges incise the sides of the separator grooves before the cutting edges of the teeth remove the material from between the sides of the groove, thereby obviating the forming of ragged groove edges when the grooves are cut in a wet battery separator.

Another object of the invention is the provision of a cutting tool for cutting grooves on one face of a wet battery separator, in which tool equally spaced teeth are provided, each having rib-like extensions along the side edges, which confine a recess along the middle of each tooth, the adjacent ribs of two adjacent teeth being united at the inoperative end of the cutter, the other end of the ribs being sharpened so as to form cutting edges at the ends of said recesses, said recesses corresponding to the width of grooves to be cut on a battery separator, so that said side cutting edges impress the side edges of the grooves to be cut, thereby assuring straight edged grooves. A holder for the blade is provided, the face of said holder having ribs thereon corresponding to the recesses on said cutting tool, so as to be engaged thereby when holding the tool in position. This also acts as chip breaker and curls or breaks the material cut.

Other objects of the invention are to provide a device of the character described that will be superior in point of simplicity, inexpensiveness of construction, positiveness of operation, facility and convenience in use, and general efficiency.

In this specification and the annexed drawings, the invention is illustrated in the form considered to be the best, but it is to be understood that the invention is not limited to such form because it may be embodied in other forms; and it is also to be understood that in and by the claims following the description, it is desired to cover the invention in whatsoever form it may be embodied.

The preferred embodiment of my invention is illustrated in the accompanying drawings, in which—

Figure 1 is a somewhat diagrammatic view of the machine in which the groove-cutting operation on the battery separators is performed;

Figure 2 is a perspective view of the holder for the cutting tool;

Figure 3 is a perspective view of the groove-cutting tool;

Figure 4 is a sectional view taken on the line 4—4 of Fig. 3;

Figure 5 is a sectional view of the cutting tool, taken on the line 5—5 of Figure 3; and Figure 6 is a perspective view of a battery separator, illustrating the grooves cut on the surface thereof.

Referring to the accompanying drawings, wherein similar reference characters designate similar parts thruout, the various figures described above adequately illustrate my invention, and the following detailed description is commensurate with the above mentioned drawings in enabling an artisan to construct and assemble the constituent parts of the same.

In carrying out my invention, I make use of a cutting blade, designated in its entirety by the numeral 6. The cutting blade 6 is made preferably from a single piece of material, a face 7 of which is smooth. The edge of the smooth face is tapered as at 8 toward spaced cutting edges 9. Each cutting edge 9 forms the operating edge of a tooth 11. The other face of the tool is provided with grooves 12, extending from the edge 9 of each tooth to the other edge of the tool and being of a width slightly less than that of the teeth 11. The adjacent sides 10 of the adjacent grooves 12 are united at the inoperative end of the tool 6, so as to form ribs 13 thereat, substantially at right angles to the bottom of the groove 12. The ribs 13, between the adjacent sides 10 of the groove 12, are cut away in a gradual taper, the extreme edges 14 thereof terminating short of the cutting edges 9. The sides 10 of the grooves taper toward the cutting edges 9 and are sharpened so as to form tapered side cutting edges 17 at the opposite sides of the cutting edges 9 of the teeth 11. It is to be noted that the side cutting edges 17 terminate at a straight edge 15 extending between the end of the cutting edges 17 and 9.

The grooved face of the tool is divided into two sections by a wide rib 18 which tapers to an edge 14, positioned similarly to the tapered end of the ribs 13. The particular spacing and size of the ribs may be changed according to the requirements of the different types of battery separators. The tool 6, illustrated, is suitable for use in connection with a battery separator 19, shown in Figure 6. The cut away portion of the rib 18 corresponds to a wide rib 20 between the central grooves 21 of the battery separator 19, while the cut away portions of the ribs 13 corresponds to the ribs 22 between the adjacent grooves 21 of the separator 19.

In use, the cutting tool 6 is so disposed that the side cutting edges 17 are first impressed into the face of the battery separator sheet 19, and thus incise straight groove edges. The further feeding of the tool 6 and the battery separator 19 will cut the grooves between the straight edges and remove the material therefrom.

A wedge, denoted in its entirety by the numeral 23, is provided for the purpose of holding the tool in place in a rotary body, denoted by the numeral 24. On an inclined face 26 of the wedge 23 are cut slots 27 for receiving the ribs 13 and a slot 28 for receiving the rib 18 therein. Ribs 29 formed between the adjacent slots of the wedge fit into the slots 12 of the cutting tool 6.

The cutting tool 6 is placed upon the inclined face 26 of the wedge 23 so that the ribs 29 extend into the slot 12. The wedge 23 and the tool 6 are placed in a recess 31 on the rotary body 24, an inclined face 32 of the recess 31 forming the same angle with the bottom of the recess 31 as the inclined face 26 forms with a side 33 of the wedge 23. Therefore, when the wedge and the tool are placed in the recess 31 so that the side 33 of the wedge is disposed over the bottom of the recess 31, then the tool 6 resting upon the inclined face 26 of the wedge 23 is maintained in a position substantially parallel with the inclined side 32 of the slot 31. In order to hold the tool 6 and the wedge 23 in position, screws 34 are provided which are threadedly secured into threaded holes 36 in the face of the wedge 23 opposite to the inclined face 26. Thus, when the wedge and the tool are disposed in the recess 31, the unscrewing of the screws 34 from the threaded holes 36 will bring the head of the screw 34 into contact with the adjacent side of the recess 31; thereby, pressure will be exerted upon the wedge 23 and the tool 6 which will firmly hold the tool 6 against the inclined side 32 of the recess 31. The outside face 35 of the wedge 23 slants outwardly toward the blade edge, thereby providing a surface for breaking the chips, or curling and breaking the material cut by the tool.

It is to be noted that there are two diametrically opposite slots 31 provided in the rotary body 23 so that when the body 24 is rotated at a high rate of speed, the tools will cut a continuous groove on the slowly fed separator sheets 19.

The cutting of the grooves on the battery separator sheets 19 is accomplished in the machine, somewhat diagrammatically illustrated in Figure 1. Upon a frame 37 of the machine is supported a bearing 38 in which is rotatably supported the rotary body 24, which body is rotated at a high rate of speed in the usual manner. The battery separators 19 are advanced upon the frame 37 by means of feed rollers 39, driven in the usual manner at a comparatively low rate of speed. The battery separator sheets 19 are guided in their advancement on the frame 37 by means of guides 41 disposed on the frame 37, adjacent to the opposite edges of the separators 19.

In operation, the speed ratio between the rotation of the body 24 and the speed of the feeding of the battery separator sheets 19 is high, thereby assuring a continuous cut with a limited number of cutting blades. At each cut, the side edges 17 cut the sides of the grooves slightly in advance of the cutting edge 9, which latter cuts the depth of the groove between the incised side edges. The portion of the grooves 12 extending over the wedge 23 are completely filled by the corresponding ribs 29, thereby the forcing of any foreign material between the tool 6 and the wedge 23 is prevented; whereby the prying of the tool 6 apart from the wedge 31 is also entirely eliminated. The inclined outside face 35 of the wedge breaks or curls the material cut.

It will be recognized that a particularly facile device is provided to accomplish the above described cutting of grooves in wet or green battery separator sheets; and one which combines accurate and smooth cutting of grooves, with a ruggedness of construction and positiveness of operation, especially adapting it for its use. Being a unitary character, the tool requires no careful setting up, and lends itself to effective application by the labor ordinarily available.

Claims:

1. A cutter blade having a plurality of ribs, the forward ends of which form spaced incising points, cutting blades extending between the incising points at right angles thereto and at the bottom thereof, the incising points extending beyond the cutting blades.

2. A cutter blade having a plurality of ribs, the forward ends of which form spaced incising points extending beyond a transverse edge forming cutting blades and connecting said points adjacent their ends and at the bottom thereof.

3. A cutter blade having a plurality of ribs, the forward ends of which form spaced incising points extending beyond a transverse edge connecting said points adjacent the ends, said edge forming cutting blades interposed between the incising points at right angles thereto and at the bottom thereof, the ends of the incising points being tapered and terminating in a cutting edge perpendicular to the face of the interposed cutting blades.

4. Means for securing a cutter blade to a rotatable head having a recess therein, said cutter blade having a plurality of ribs, the forward ends of which form spaced incising points, a cutting edge interposed between and at the bottom of said ribs, said incising points extending beyond said cutting edge, a wedge having complementary ribs for insertion between the incising points, and means for securing the cutter blade and the wedge within the recess.

In testimony whereof I affix my signature.

JOHN H. DALEN.